(12) United States Patent
Zhou et al.

(10) Patent No.: US 10,819,128 B2
(45) Date of Patent: Oct. 27, 2020

(54) DEVICE FOR ENABLING AUTONOMOUS POWERING OF MONITORING NODE OF SCRAPER CONVEYOR CHAIN

(71) Applicants: China University of Mining and Technology, Jiangsu (CN); JIANGSU TIANMING MACHINERY GROUP, Jiangsu (CN)

(72) Inventors: Gongbo Zhou, Jiangsu (CN); Zhencai Zhu, Jiangsu (CN); Yaobin Lv, Jiangsu (CN); Benliang Hao, Jiangsu (CN); Wei Li, Jiangsu (CN); Pengpeng Chen, Jiangsu (CN); Guohua Cao, Jiangsu (CN); Junhua Yi, Jiangsu (CN); Yuxing Peng, Jiangsu (CN); Gang Shen, Jiangsu (CN)

(73) Assignees: China University of Mining and Technology, Jiangsu (CN); JIANGSU TIANMING MACHINERY GROUP, Jiangsu (CN)

( * ) Notice: Subject to any disclaimer, the term of this patent is extended or adjusted under 35 U.S.C. 154(b) by 0 days.

(21) Appl. No.: 16/645,493

(22) PCT Filed: Nov. 26, 2018

(86) PCT No.: PCT/CN2018/117441
§ 371 (c)(1),
(2) Date: Mar. 9, 2020

(87) PCT Pub. No.: WO2019/063027
PCT Pub. Date: Apr. 4, 2019

(65) Prior Publication Data
US 2020/0203970 A1 Jun. 25, 2020

(30) Foreign Application Priority Data
Sep. 28, 2017 (CN) .......................... 2017 1 0897114

(51) Int. Cl.
*H01M 10/46* (2006.01)
*H02J 7/00* (2006.01)
(Continued)

(52) U.S. Cl.
CPC .............. *H02J 7/0042* (2013.01); *H02J 7/14* (2013.01); *H02K 7/1846* (2013.01)

(58) Field of Classification Search
CPC .. H02J 7/0042; H02J 7/14; H02J 7/355; H02J 50/10; H02J 50/90; F03B 12/12
(Continued)

(56) References Cited

U.S. PATENT DOCUMENTS

| 6,920,951 B2 * | 7/2005 | Song | B60K 25/10 |
| | | | 180/165 |
| 2001/0022245 A1 * | 9/2001 | Rogg | B60K 6/48 |
| | | | 180/65.21 |

(Continued)

FOREIGN PATENT DOCUMENTS

| CN | 204660729 | 9/2015 |
| CN | 205441711 | 8/2016 |

(Continued)

OTHER PUBLICATIONS

"International Search Report (Form PCT/ISA/210) of PCT/CN2018/117441", dated Mar. 7, 2019, with English translation thereof, pp. 1-5.

*Primary Examiner* — Edward Tso
(74) *Attorney, Agent, or Firm* — JCIPRNET

(57) ABSTRACT

A device for enabling autonomous powering of a monitoring node of a scraper conveyor chain includes a bottom baffle, a friction wheel drive device, a limiting device, a generator, an energy storage battery, a cable entry device, and dampers. The bottom baffle is connected to a bottom portion of a scraper of a scraper conveyor. The friction wheel drive
(Continued)

device comprises a ball, a friction wheel, a drive shaft connected to the generator, and a shaft coupler. The friction wheel is disposed on the drive shaft, and an outer edge of the friction wheel is in contact with a surface of the ball. The limiting device is a ball housing that is connected to the bottom baffle, and is used for limiting the ball within the ball housing. The energy storage battery is connected to the generator, and is used to store electrical energy generated from the generator. The dampers are disposed on the drive shaft.

10 Claims, 3 Drawing Sheets

(51) Int. Cl.
*H02J 7/14* (2006.01)
*H02K 7/18* (2006.01)

(58) Field of Classification Search
USPC .............. 320/101, 104, 107, 108; 180/65.31, 180/65.51, 165; 290/1 R, 4 A, 4 B, 53
See application file for complete search history.

(56) References Cited

U.S. PATENT DOCUMENTS

| | | | |
|---|---|---|---|
| 2009/0085530 A1 | 4/2009 | Matsubara | |
| 2010/0006362 A1* | 1/2010 | Armstrong | F03G 7/08 180/165 |
| 2010/0244457 A1* | 9/2010 | Bhat | F16F 15/005 290/1 A |
| 2012/0313575 A1* | 12/2012 | Stansbury, III | B60G 13/14 320/107 |

FOREIGN PATENT DOCUMENTS

| | | |
|---|---|---|
| CN | 106931870 | 7/2017 |
| CN | 107516927 | 12/2017 |

* cited by examiner

DEVICE FOR ENABLING AUTONOMOUS POWERING OF MONITORING NODE OF SCRAPER CONVEYOR CHAIN

CROSS-REFERENCE TO RELATED APPLICATION

This application is a 371 of international application of PCT application serial no. PCT/CN2018/117441, filed on Nov. 26, 2018, which claims the priority benefit of China application no. 201710897114.4, filed on Sep. 28, 2017. The entirety of each of the above mentioned patent applications is hereby incorporated by reference herein and made a part of this specification.

BACKGROUND

Technical Field

The present invention belongs to the field of power generation with scraper conveyors, and particularly relates to a device for enabling autonomous powering of a monitoring node of a scraper conveyor chain.

Description of Related Art

In recent years, due to the needs of social progress and production development, safety issues have been repeatedly stressed and placed on critical production premises. The importance of a scraper conveyor health monitoring system is not only reflected in the ability to provide chain-breaking, chain-jamming, scraper fault light monitoring, but more importantly, reflected in the ability to monitor and evaluate the health status of each component of the scraper in real time, and effectively check and timely alert components that may have safety problems, thereby reducing the possibility of safety accidents. A sensor node is an important part of a WSN. Currently, most of the sensor nodes are battery-powered, and thus, a power supply is very important.

Since the scraper conveyor is a revolving body, it is difficult to externally power a monitoring node on the conveyor chain. Therefore, it is necessary to power the battery by means of internal redundant energy recovery.

SUMMARY

To overcome the deficiencies in the prior art, the present invention provides a device for enabling the autonomous powering of a monitoring node of a scraper conveyor chain, which is capable of collecting and utilizing redundant energy of a scraper conveyor to power the monitoring node of the scraper conveyor chain.

To achieve the foregoing objective, the present invention adopts following technical solution.

A device for enabling the autonomous powering of a monitoring node of a scraper conveyor chain includes a bottom baffle, a friction wheel drive device, a limiting device, a generator, an energy storage battery, a cable entry device, and dampers.

Wherein, the bottom baffle is connected to a bottom portion of a scraper of a scraper conveyor and serves as an explosion-proof enclosure.

The friction wheel drive device comprises a ball, a friction wheel, a drive shaft, and a shaft coupler. The drive shaft is connected to the generator by means of the shaft coupler. The friction wheel is disposed on the drive shaft, and the outer edge of the friction wheel is in contact with the surface of the ball. The ball is disposed on a through hole formed on the bottom baffle and having a diameter less than the diameter of the ball, and is limited by the limiting device.

The limiting device is a ball housing that is connected to the bottom baffle, and is used for limiting the ball within the housing.

The energy storage battery is connected to the generator, and is used to store the electrical energy obtained from the generator.

The cable entry device comprises a straight section and a joint section. The straight section is welded from the outside of the explosion-proof enclosure, and the joint section is welded from the inside of the explosion-proof enclosure.

The dampers are disposed on the drive shaft.

The generator is fixed on a motor bracket. The motor bracket is fixed on the scraper of the scraper conveyor.

The bottom baffle has a thickness of 10 mm and is connected to the bottom portion of the scraper by means of a screw. The ball housing is connected to the bottom baffle by means of a screw.

The ball is a manganese steel ball having a diameter of 40 mm.

The friction wheel consists of an inner ring and an outer ring sleeved on the inner ring. The inner ring is made of steel, and the outer ring is made of a PU rubber.

A circlip is disposed on the drive shaft and abuts against the friction wheel for positioning the friction wheel.

The drive shaft is a D-shaped shaft. The shaft coupler is a diaphragm shaft coupler.

The ball housing comprises a ball housing bottom and an upper ball housing cover. The upper ball housing cover is disposed on the ball housing bottom, and a rubber gasket is disposed at a connection thereof. An opening is formed at a bottom portion of the ball housing bottom.

The generator is a 3V direct-current generator. The energy storage battery is a lithium ion battery and is connected to a control circuit.

The dampers comprise a proximal damper and a distal damper respectively located on the drive shaft at both sides of the friction wheel.

Advantageous Effect: In the present invention, a driven friction wheel moves along with a scraper so that kinetic energy may be harvested, and electrical energy may then be generated by means of electromagnetic induction, which greatly prolongs the service life of the battery, thereby allowing the scraper conveyor monitoring node to operate in a stable manner for a long period of time.

According to the device for enabling the autonomous powering of a monitoring node of a scraper conveyor chain of the present invention, the explosion-proof enclosure is sufficient to resist the explosion pressure of the explosive gas methane. The ball has a certain self-adjusting and self-cleaning ability when it is driven, which ensures its own stability and greatly improves the error-tolerant rate in operation under complicated and harsh underground conditions. The ball is made of high-manganese wear-resistant steel, which is not easy to wear in a large impact environment, thereby ensuring the continuity of operation. The friction wheel adopts a concave curved surface to increase the contact area with the arc surface of the ball. The outer layer of the friction wheel is made of a PU rubber, which has a high friction coefficient and good wear resistance, and can maintain no chemical reaction for a long time in a high-temperature, humid and acidic underground environment. The damper can effectively protect the drive components under impact conditions and provide a necessary positive pressure for the friction wheel drive.

In summary, the autonomous powering device meets the explosion-proof requirements of coal mines, and can realize the autonomous powering of a tension monitoring node of a scraper conveyor chain, has good impact resistance, vibration resistance, good structural stability, and stable output voltage, and can be modified and applied to similar fields, so as to provide power generation support for a revolving body monitoring node.

BRIEF DESCRIPTION OF THE DRAWINGS

FIG. 2a is a front view of the friction wheel, and FIG. 2b is a side view of the friction wheel;

DESCRIPTION OF THE EMBODIMENTS

The present invention is further described below with reference to the accompanying drawings.

Figure 1:
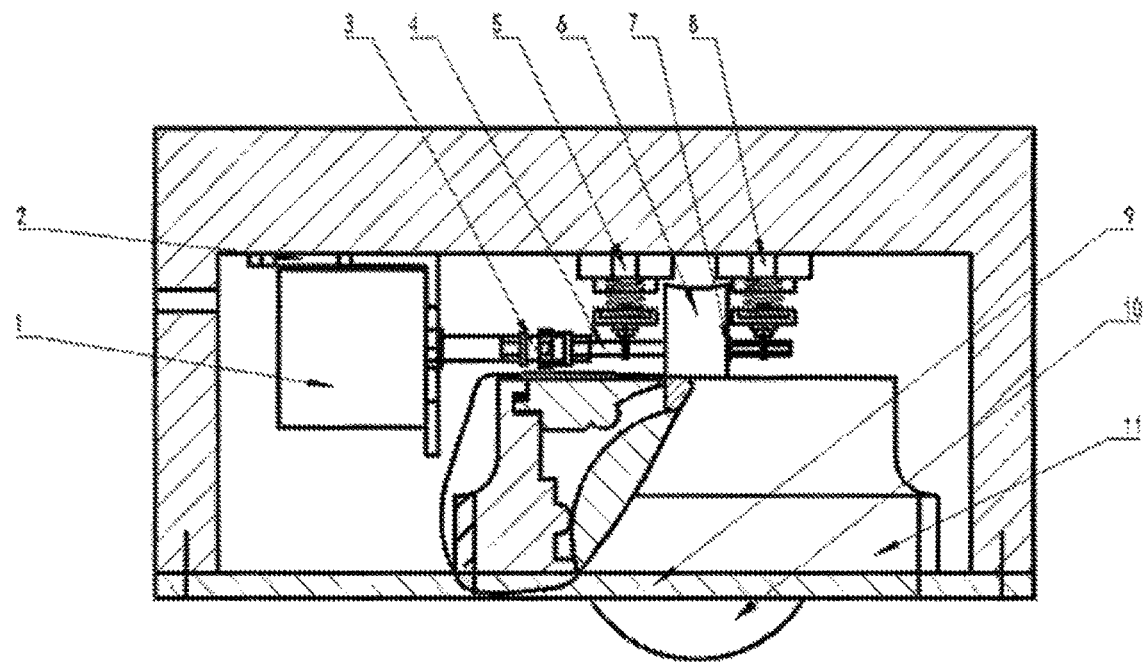
FIG. 1 is a front cross-sectional view of an enclosure of an autonomous powering device of the present invention.

As shown in FIG. 1, a device for enabling the autonomous powering of a monitoring node of a scraper conveyor chain comprises a bottom baffle 9, a friction wheel drive device, a limiting device, a generator 1, an energy storage battery, a cable entry device, and dampers.

The bottom baffle 9 is connected to a bottom portion of a scraper of a scraper conveyor and serves as an explosion-proof enclosure. The bottom baffle 9 has a thickness of 10 mm and is connected to the bottom portion of the scraper by means of a screw.

Figure 2A:
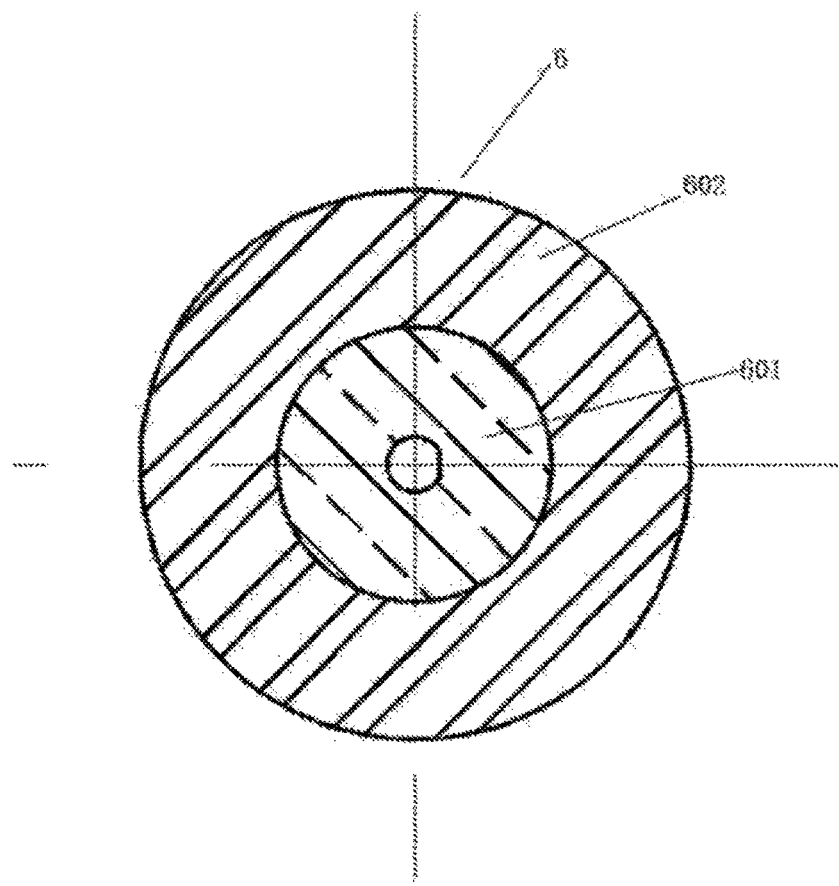
FIG. 2a and FIG. 2b are schematic diagrams of a friction wheel, where
Figure 2B:
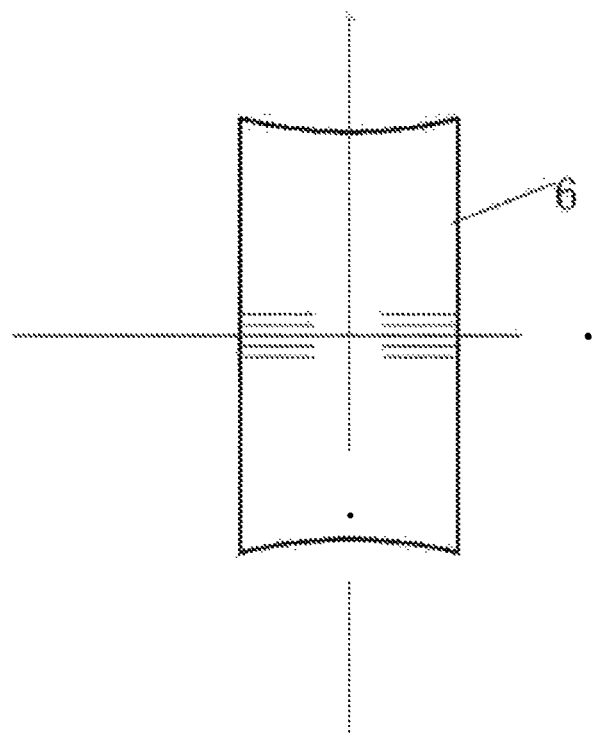

The friction wheel drive device comprises a ball 10, a friction wheel 6, a drive shaft 4, and a shaft coupler 5. The drive shaft 4 is connected to the generator 1 by means of the shaft coupler 3. The friction wheel 6 is disposed on the drive shaft 4. A circlip 7 is disposed on the drive shaft 4 and abuts against the friction wheel 6 for positioning the friction wheel 6. An outer edge of the friction wheel 6 is in contact with the surface of the ball 10. The ball 10 is a manganese steel ball having a diameter of 40 mm and disposed on a through hole formed on the bottom baffle 9 and having a diameter less than the diameter of the ball, and is limited by the limiting device. As shown in FIG. 2a and FIG. 2b, the friction wheel 6 consists of an inner ring 601 and an outer ring 602 sleeved on the inner ring. The inner ring 601 is made of steel, and the outer ring 602 is made of a PU rubber. An outer end face of the friction wheel 6 is an arc concave surface. Preferably, the drive shaft is a D-shaped shaft, and the shaft coupler is a diaphragm shaft coupler.

Figure 3:
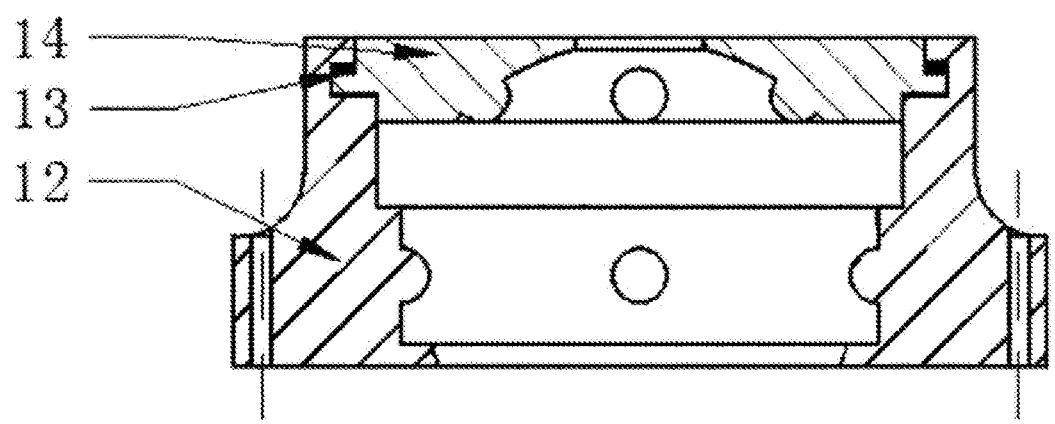
FIG. 3 is a schematic diagram of a ball housing.

The limiting device is a ball housing 11 connected to the bottom baffle 9 for limiting the ball 10 within the housing. The ball housing 11 is connected to the bottom baffle 9 by means of a screw. As shown in FIG. 3, the ball housing 11 comprises a ball housing bottom 12 and an upper ball housing cover 14. The upper ball housing cover 14 is disposed on the ball housing bottom 12, and a rubber gasket 13 is disposed at a connection thereof. An opening is formed at a bottom portion of the ball housing bottom 12, and a lower end of the ball 10 is exposed from the opening.

The energy storage battery is connected to the generator 1, and is used to store the electrical energy obtained from the generator. Preferably, the generator is a 3V direct-current generator, and the energy storage battery is a lithium ion battery and is connected to a control circuit.

The cable entry device is a power output cable entry device. According to the explosion-proof requirements of a coal mine, the cable entry of the explosion-proof enclosure must be specially processed, that is, a cable entry device is installed. The cable entry device comprises a straight section and a joint section. The straight section is welded from the outside of the explosion-proof enclosure, and the joint section is welded from the inside of the explosion-proof enclosure. A power line is connected to a node by means of the cable entry device.

Figure 4:
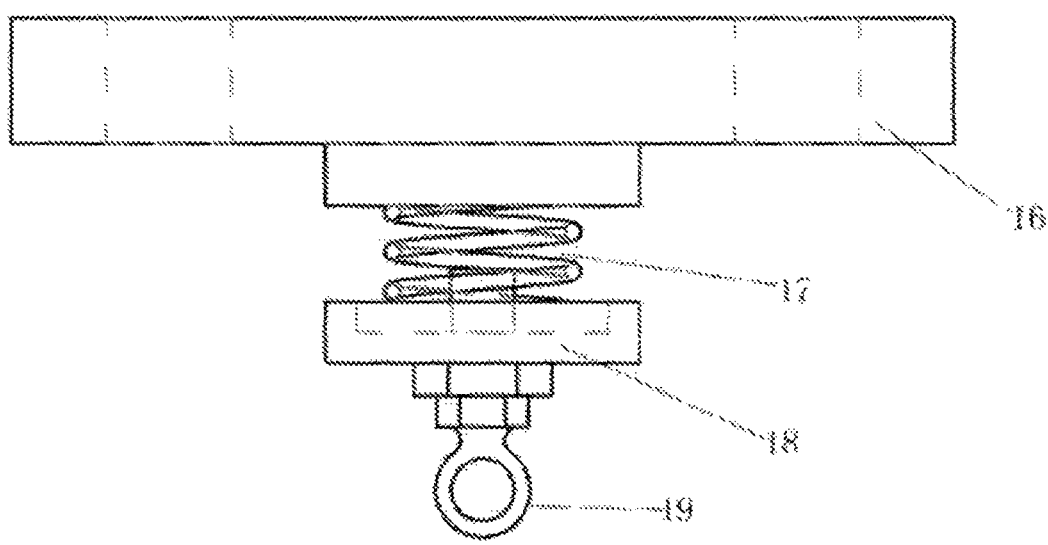
FIG. 4 is a schematic diagram of a damper.

The dampers are disposed on the drive shaft, and comprise a proximal damper 5 and a distal damper 8 respectively located on the drive shaft 4 at both sides of the friction wheel 6. As shown in FIG. 4, the damper consists of an upper connecting member 16, a damping spring 17, and a lower connecting member 18 sequentially connected to each other. A circular ring 19 is disposed on the lower connecting member 18 and is sleeved on the drive shaft 4. The upper connecting member 16 is fixed to the scraper of the scraper conveyor.

The generator 1 is fixed on a motor bracket 2, and the motor bracket 2 is fixed on the scraper of the scraper conveyor.

A method for using the device for enabling the autonomous powering of a monitoring node of a scraper conveyor chain of the present invention includes following steps.

Step 1: Installation process. First, the generator 1 is fixed to the motor bracket 2, and the generator 1 is connected to the drive shaft 4 by means of the shaft coupler 3. The proximal damper 5, the friction wheel 6, and the distal damper 8 are sequentially sleeved on the drive shaft 3, and the friction wheel 6 is positioned by means of the circlip 7. The motor bracket 2, the proximal damper 5, and the distal damper 8 are positioned on a scraper at the tops thereof by means of respective screws. The ball 10 is disposed on a through hole formed on the bottom baffle 9, on which the ball housing 11 is disposed and fixed. Finally, the upper and lower portions of the ball housing 11 are assembled, and the bottom baffle 9 is fixed to the bottom portion of the scraper.

Step 2: Debugging stage. The autonomous powering device is enabled to move along with the scraper and energy harvesting is completed. The scraper is activated, and the energy harvesting efficiency is evaluated according to the movement status of the ball 10 and the amount of power generated by the generator 1. There is no abnormality in activating the ball clockwisely or counterclockwisely.

Step 3: Formal operation. The device for enabling the autonomous powering of a monitoring node of a scraper conveyor chain moves with the scraper, the kinetic energy of the ball is transferred to the generator by means of the friction wheel, the drive shaft and the shaft coupler, and the generator powers the lithium ion battery to drive the monitoring node to operate normally.

The above are only preferred embodiments of the present invention, and it should be noted that a person of ordinary skill in the art can make several modifications and improvements, without departing from the principle of the present invention. These improvements and modifications should also be construed as falling within the scope of the present invention.

What is claimed is:

1. A device for enabling autonomous powering of a monitoring node of a scraper conveyor chain, the device comprising a bottom baffle, a friction wheel drive device, a limiting device, a generator, an energy storage battery, a cable entry device, and a plurality of dampers;

wherein the bottom baffle is connected to a bottom portion of a scraper of a scraper conveyor and serves as an explosion-proof enclosure;

the friction wheel drive device comprises a ball, a friction wheel, a drive shaft, and a shaft coupler, wherein the drive shaft is connected to the generator by means of the shaft coupler; the friction wheel is disposed on the drive shaft, and an outer edge of the friction wheel is in contact with a surface of the ball; the ball is disposed on a through hole formed on the bottom baffle and having a diameter less than a diameter of the ball, and is limited by the limiting device;

the limiting device is a ball housing that is connected to the bottom baffle, and is used for limiting the ball within the ball housing;

the energy storage battery is connected to the generator, and is used to store electrical energy generated from the generator;

the cable entry device comprises a straight section and a joint section, wherein the straight section is welded from outside of the explosion-proof enclosure, and the joint section is welded from inside of the explosion-proof enclosure; and the dampers are disposed on the drive shaft.

2. The device for enabling the autonomous powering of the monitoring node of the scraper conveyor chain according to claim 1, wherein the generator is fixed on a motor bracket; and the motor bracket is fixed on the scraper of the scraper conveyor.

3. The device for enabling the autonomous powering of the monitoring node of the scraper conveyor chain according to claim 1, wherein the bottom baffle has a thickness of 10 mm and is connected to the bottom portion of the scraper by means of a screw; and the ball housing is connected to the bottom baffle by means of a screw.

4. The device for enabling the autonomous powering of the monitoring node of the scraper conveyor chain according to claim 1, wherein the ball is a manganese steel ball having a diameter of 40 mm.

5. The device for enabling the autonomous powering of the monitoring node of the scraper conveyor chain according to claim 1, wherein the friction wheel consists of an inner ring and an outer ring sleeved on the inner ring; the inner ring is made of steel, and the outer ring is made of PU rubber.

6. The device for enabling the autonomous powering of the monitoring node of the scraper conveyor chain according to claim 1, wherein a circlip is disposed on the drive shaft and abuts against the friction wheel for positioning the friction wheel.

7. The device for enabling the autonomous powering of the monitoring node of the scraper conveyor chain according to claim 1, wherein the drive shaft is a D-shaped shaft; and the shaft coupler is a diaphragm shaft coupler.

8. The device for enabling the autonomous powering of the monitoring node of the scraper conveyor chain according to claim 1, wherein the ball housing comprises a ball housing bottom and an upper ball housing cover; the upper ball housing cover is disposed on the ball housing bottom, and a rubber gasket is disposed at a connection thereof; and an opening is formed at a bottom portion of the ball housing bottom.

9. The device for enabling the autonomous powering of the monitoring node of the scraper conveyor chain according to claim 1, wherein the generator is a 3V direct-current generator; and the energy storage battery is a lithium ion battery and is connected to a control circuit.

10. The device for enabling the autonomous powering of the monitoring node of the scraper conveyor chain according to claim 1, wherein the dampers comprise a proximal damper and a distal damper respectively located on the drive shaft at both sides of the friction wheel.

\* \* \* \* \*